(12) United States Patent
Iikawa et al.

(10) Patent No.: US 7,004,672 B2
(45) Date of Patent: Feb. 28, 2006

(54) BAYONET COUPLING FOR AXIALLY MOUNTING ONE OF TWO RELATIVELY ROTATABLE RING-SHAPED MEMBERS ON THE OTHER

(75) Inventors: Makoto Iikawa, Saitama (JP); Masashi Takahashi, Saitama (JP)

(73) Assignee: PENTAX Corporation, Tokyo (JP)

( * ) Notice: Subject to any disclaimer, the term of this patent is extended or adjusted under 35 U.S.C. 154(b) by 124 days.

(21) Appl. No.: 10/751,532

(22) Filed: Jan. 6, 2004

(65) Prior Publication Data

US 2004/0136777 A1    Jul. 15, 2004

(30) Foreign Application Priority Data

Jan. 8, 2003    (JP)    ............................. 2003-002441

(51) Int. Cl.
*F16B 7/20*    (2006.01)

(52) U.S. Cl. .................. 403/348; 403/349; 403/353; 396/531; 396/532; 359/828

(58) Field of Classification Search ............... 403/348, 403/349, 350, 353; 396/531, 532; 359/828
See application file for complete search history.

(56) References Cited

U.S. PATENT DOCUMENTS

| 4,017,878 | A | | 4/1977 | Hagiwara |
| 4,537,539 | A | * | 8/1985 | Borchardt .................. 403/348 |
| 5,274,413 | A | | 12/1993 | Nomura et al. |
| 5,731,913 | A | | 3/1998 | Imanari |
| 6,257,794 | B1 | * | 7/2001 | Gobled et al. ............... 403/353 |
| 6,421,192 | B1 | | 7/2002 | Nomura et al. |
| 6,702,507 | B1 | * | 3/2004 | Wild .......................... 403/353 |
| 2002/0105731 | A1 | | 8/2002 | Iikawa et al. |

FOREIGN PATENT DOCUMENTS

| JP | 6-75152 | 3/1994 |
| JP | 8-146278 | 6/1996 |
| JP | 2002-236243 | 8/2002 |

* cited by examiner

*Primary Examiner*—Daniel P. Stodola
*Assistant Examiner*—Michael P. Ferguson
(74) *Attorney, Agent, or Firm*—Greenblum & Bernstein, P.L.C.

(57) ABSTRACT

A bayonet coupling including an annular groove and bayonet lugs on an inner ring-shaped member and an outer ring-shaped member; and insertion openings formed on either the inner ring-shaped member or the outer ring-shaped member which includes the annular groove. The bayonet lugs includes first bayonet lugs associated with the insertion openings to be insertable into the annular groove through the insertion openings, and a second bayonet lug for which no associated insertion opening is formed. The insertion openings, the first bayonet lugs and the second bayonet lug are shaped so that the second bayonet lug is insertable into the annular groove with axes of the outer and inner ring-shaped members being inclined to each other, and so that the first bayonet lugs are insertable into the annular groove through the insertion openings, respectively, after the second bayonet lug is inserted into the annular groove.

8 Claims, 7 Drawing Sheets

Fig. 4
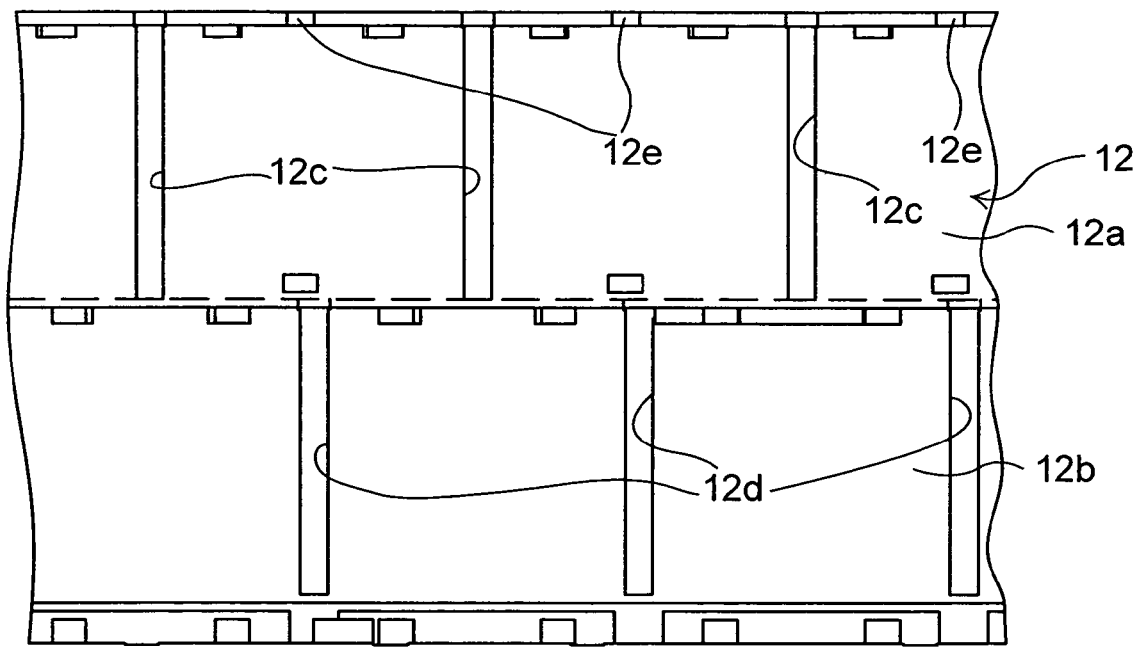
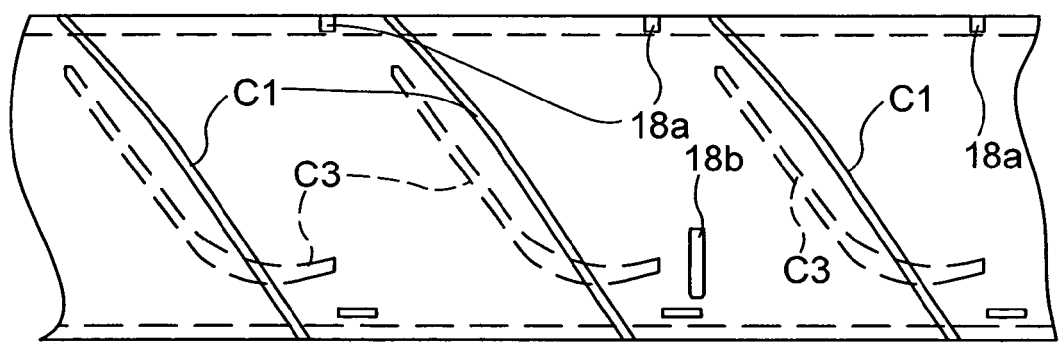
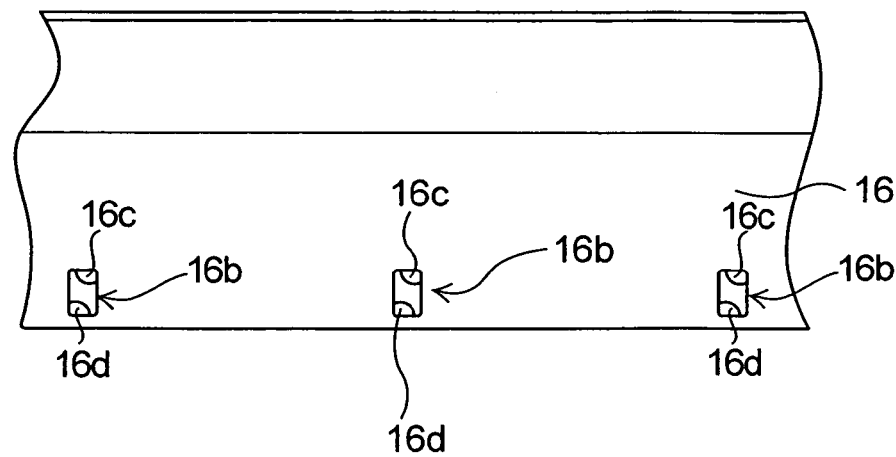

BAYONET COUPLING FOR AXIALLY MOUNTING ONE OF TWO RELATIVELY ROTATABLE RING-SHAPED MEMBERS ON THE OTHER

BACKGROUND OF THE INVENTION

1. Field of the Invention

The present invention relates to a bayonet coupling, between two relatively rotatable ring-shaped members, for axially mounting one of the two relatively rotatable ring-shaped members on the other. The two ring-shaped members can be elements of a lens barrel.

2. Description of the Related Art

In a lens barrel such as a photographing lens barrel for camera, it is sometimes required that two ring-shaped members of the lens barrel, one of which is axially mounted on the other, be engaged with each other so that at least one of the two ring-shaped members is rotatable relative to the other while preventing the two ring-shaped members from moving in the axial direction thereof relative to each other. As an example of this structure, a conventional mechanism in which an outer ring-shaped member is axially mounted on an inner ring-shaped member in a bayonet fashion is known in the art. Specifically, an annular groove having a plurality of insertion openings (cutout portions) are formed on an outer peripheral surface of the inner ring-shaped member (or on an inner peripheral surface of the outer ring-shaped member), while a corresponding plurality of bayonet lugs which are engaged in the annular groove through the plurality of insertion openings are formed on an inner peripheral surface of the outer ring-shaped member (or on an outer peripheral surface of the inner ring-shaped member).

In such a conventional mechanism, the number of the bayonet lugs and the number of the insertion openings correspond to each other in a one-to-one relationship. Based on this relationship between the bayonet lugs and the insertion openings, various proposals for the number of the insertion openings (the number of the bayonet lugs), the circumferential widths of the insertion openings (the circumferential widths of the bayonet lugs), the radial height of the insertion openings (the radial height of the bayonet lugs), have been made to prevent the two relatively rotatable ring-shaped members from being disengaged from each other within a maximum range of relative rotation between the two relatively rotatable ring-shaped members. Any of such conventional proposals are based on the established idea of making the number of the insertion openings and the number of the bayonet lugs correspond to each other in a one-to-one relationship. Such an established idea limits the maximum range of rotation between the two relatively rotatable ring-shaped members, and further limits improvements in operability of the two relatively rotatable ring-shaped members. The operability of the two relatively rotatable ring-shaped members deteriorates, e.g., when one of the plurality of bayonet lugs accidentally hits one of the circumferentially opposite ends of one of the plurality of insertion openings within a predetermined range of rotation between the two relatively rotatable ring-shaped members.

SUMMARY OF THE INVENTION

The present invention provides a bayonet coupling for axially mounting one of two relatively rotatable ring-shaped members on the other, wherein the bayonet coupling has been devised while breaking the established idea of making the number of the insertion openings and the number of the bayonet lugs correspond to each other in a one-to-one relationship, so that a wide range of rotation between the two relatively rotatable ring-shaped members and a satisfactory operability of the two relatively rotatable ring-shaped members, which cannot be expected to be obtained in any conventional bayonet couplings if no corresponding insertion opening exists for one or more bayonet lug, are obtained. Furthermore, one of the two relatively rotatable ring-shaped members can be axially mounted on the other by making the axes of the two relatively rotatable ring-shaped members inclined to each other during assembly even if no corresponding insertion opening exists for one or more bayonet lug.

According to an aspect of the present invention, a bayonet coupling for axially mounting an outer ring-shaped member on an inner ring-shaped member to allow a relative rotation therebetween is provided, including one and the other of an annular groove and a plurality of bayonet lugs which are formed on an outer peripheral surface of the inner ring-shaped member and an inner peripheral surface of the outer ring-shaped member, respectively, so that the plurality of bayonet lugs are engaged in the annular groove to be rotatable relative to the annular groove; and a plurality of insertion openings which are formed on one of the inner ring-shaped member and the outer ring-shaped member which includes the annular groove, the annular groove being open in a direction parallel to an axial direction through each insertion opening of the plurality of insertion openings. The plurality of bayonet lugs includes a plurality of first bayonet lugs which are associated with the plurality of insertion openings to be insertable into the annular groove through the plurality of insertion openings, respectively, and at least one second bayonet lug for which no associated insertion opening is formed on the one of the inner ring-shaped member and the outer ring-shaped member which includes the annular groove. The plurality of insertion openings, the plurality of first bayonet lugs and the second bayonet lug are shaped so that the second bayonet lug is insertable into the annular groove with axes of the outer ring-shaped member and the inner ring-shaped member being inclined to each other, and so that the plurality of first bayonet lugs are insertable into the annular groove through the plurality of insertion openings, respectively, after the second bayonet lug is inserted into the annular groove.

It is desirable for the second bayonet lug to include a plurality of bayonet lugs.

It is desirable for a circumferential width of the second bayonet lug to be greater than a width of any bayonet lug of the plurality of first bayonet lugs.

It is desirable for the plurality of first bayonet lugs to have different circumferential widths, and for the plurality of insertion openings to have different circumferential widths correspondingly.

It is desirable for the circumferential widths of the plurality of first bayonet lugs to be different from each other and the circumferential widths of the plurality of insertion openings to be different from each other correspondingly, so that one bayonet lug of the plurality of first bayonet lugs which has a wide circumferential width passes by the insertion opening of the plurality of insertion openings for another bayonet lug of the plurality of first bayonet lugs which has a narrow circumferential width when one of the outer ring-shaped member and the inner ring-shaped member rotates relative to the other.

It is desirable for the inner ring-shaped member to be a stationary member of a lens barrel, and for the outer ring-shaped member to be a rotatable ring-shaped member of the lens barrel.

It is desirable for the annular groove and the plurality of bayonet lugs to be formed on the outer peripheral surface of the inner ring-shaped member and the inner peripheral surface of the outer ring-shaped member, respectively. The annular groove is formed between a pair of outer flanges formed on the outer peripheral surface of the inner ring-shaped member. A plurality of cutout portions are formed on one of the pair of outer flanges to serve as the plurality of insertion openings.

It is desirable for a recess to be formed on the outer peripheral surface of the inner ring-shaped member immediately behind the other of the pair of outer flanges.

The present disclosure relates to subject matter contained in Japanese Patent Application No. 2003-002441 (filed on Jan. 8, 2003) which is expressly incorporated herein by reference in its entirety.

BRIEF DESCRIPTION OF THE DRAWINGS

The present invention will be described below in detail with reference to the accompanying drawings in which:

FIG. 4 is an exploded and developed view of the stationary ring, the second cam ring and a third lens group support frame of the zoom lens shown in FIG. 1;

DESCRIPTION OF THE PREFERRED EMBODIMENT

Figure 1:
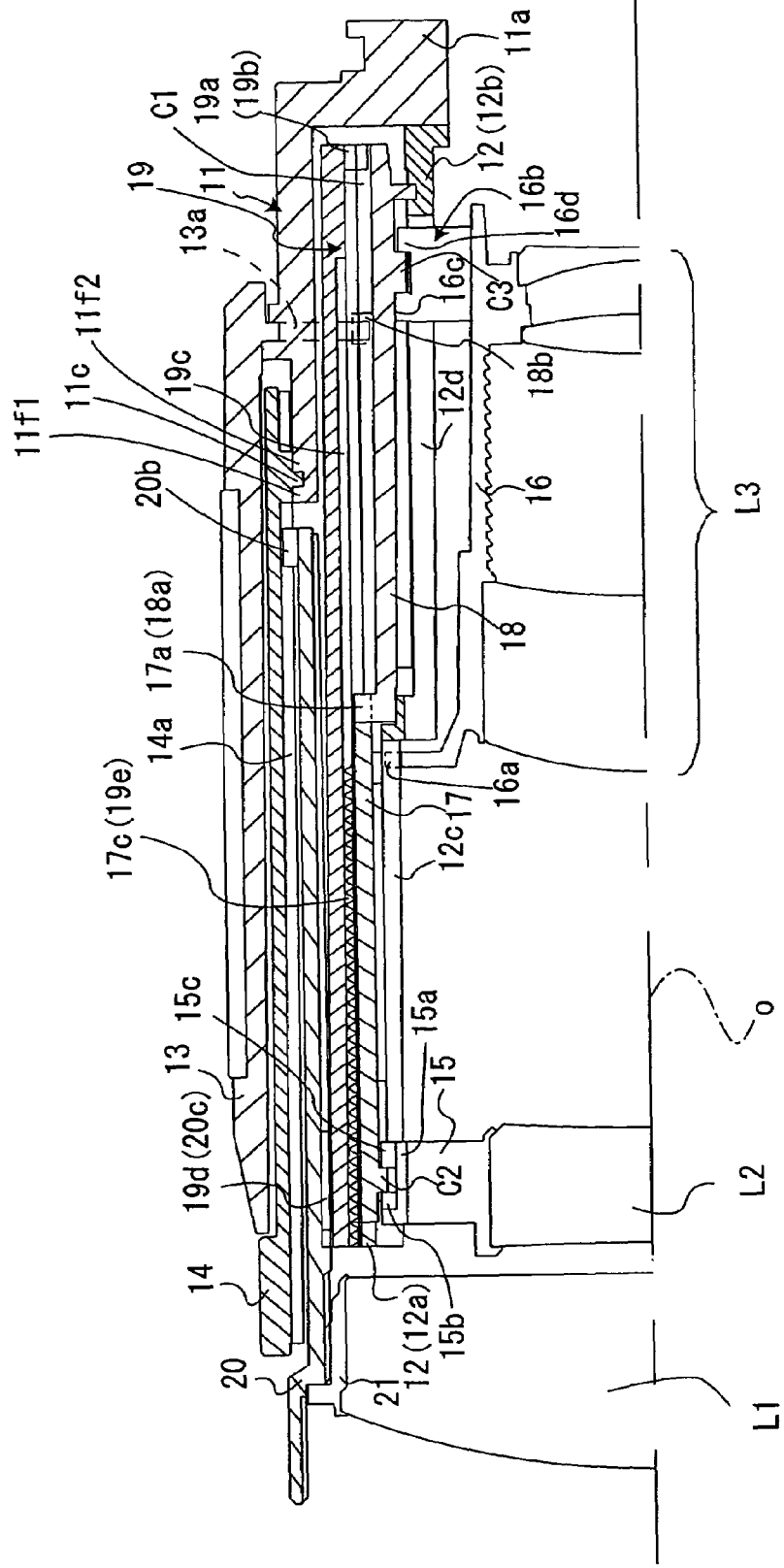
FIG. 1 is a longitudinal cross sectional view of an embodiment of an interchangeable zoom lens which incorporates a bayonet coupling according to the present invention, showing an upper half of the zoom lens from the optical axis thereof.

FIG. 1 shows an embodiment of an interchangeable zoom lens of a camera system, wherein the zoom lens incorporates a bayonet coupling according to the present invention. First, the overall structure of the zoom lens 10 will be discussed hereinafter. The zoom lens 10 is provided with a photographing optical system having three lens groups, i.e., a first lens group L1, a second lens group L2 and a third lens group L3 as shown in FIG. 1. In this photographing optical system, the first, second and third lens groups L1, L2 and L3 move along an optical axis O to perform a zooming operation, and the first lens group L1 moves along the optical axis O to perform a focusing operation.

The zoom lens 10 is provided with a mount ring (stationary ring) 11. The mount ring 11 is provided at a rear end thereof with a mounting portion 11a which is detachably attached to a camera body (not shown). The zoom lens 10 is provided inside the mount ring 11 with a stationary ring 12 which is fixed to the mount ring 11. The zoom lens 10 is provided around the mount ring 11 with a focus ring 14, and is provided around the focus ring 14 with a zoom ring 13. The zoom ring 13 and the focus ring 14 are supported by the mount ring 11 to be freely rotatable about the optical axis O without moving along the optical axis O with respect to the mount ring 11.

Figure 2:
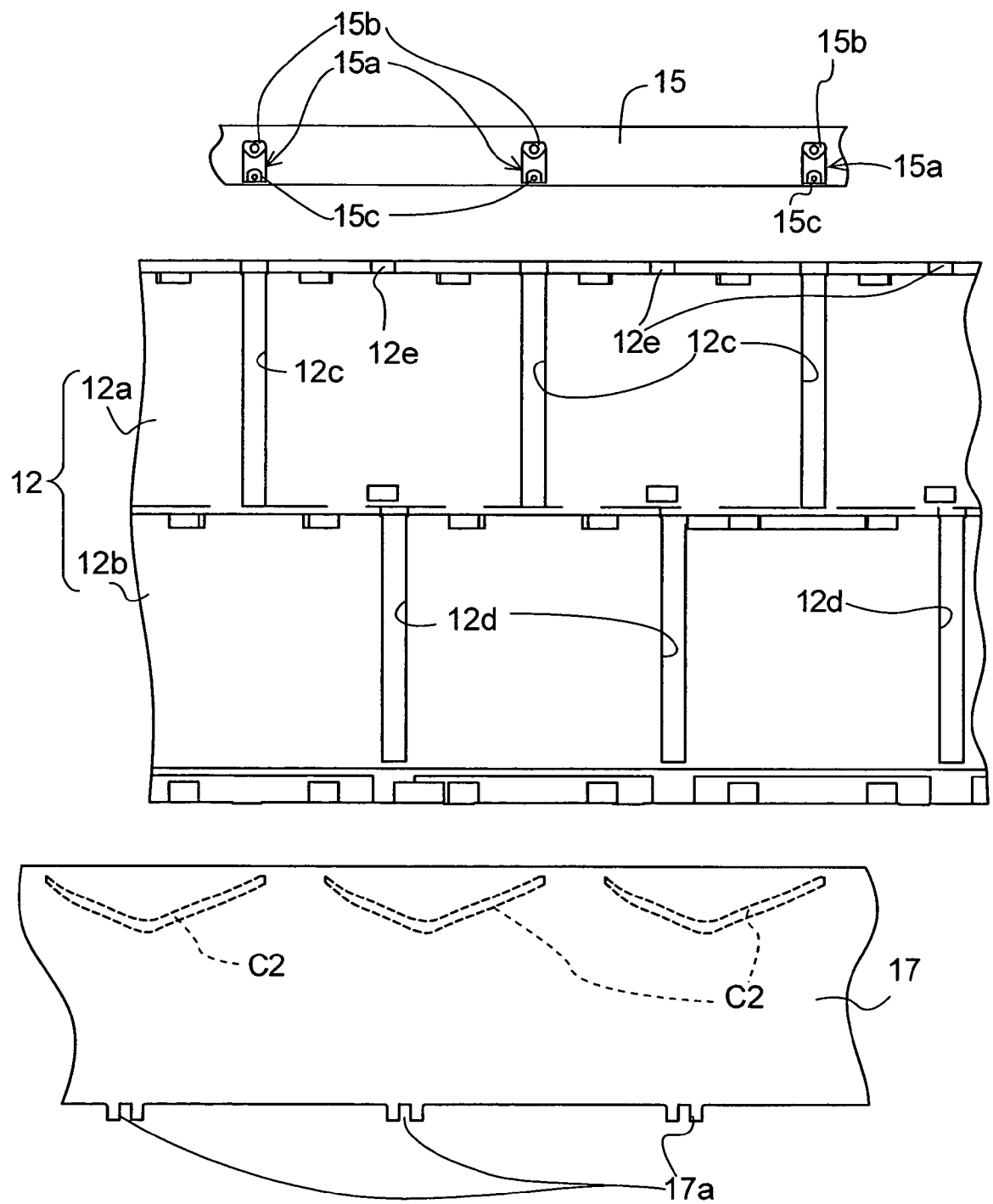
FIG. 2 is an exploded and developed view of a second lens group support ring, a stationary ring and a first cam ring of the zoom lens shown in FIG. 1.

The stationary ring 12 is provided with a front large-diameter portion 12a and a rear small-diameter portion 12b positioned behind the front large-diameter portion 12a. The front large-diameter portion 12a is provided with three front linear guide slots 12c extending parallel to the optical axis O, while the rear small-diameter portion 12b is provided with three rear linear guide slots 12d extending parallel to the optical axis O. The second lens group L2 is fixed to a second lens group support frame 15 to be supported thereby. The second lens group support frame 15 is fitted into the front large-diameter portion 12a. The second lens group support frame 15 is provided on an outer peripheral surface thereof with three linear guide projections 15a which project radially outwards to be slidably engaged in the three front linear guide slots 12c of the front large-diameter portion 12a, respectively (see FIG. 2). Accordingly, the second lens group support frame 15 is guided linearly in the optical axis direction without rotating about the optical axis O with respect to the stationary ring 12 due to the engagement of the three linear guide projections 15a with the three front linear guide slots 12c. The third lens group L3 is fixed to a third lens group support frame 16 to be supported thereby. The third lens group support frame 16 is fitted into the rear small-diameter portion 12b. The third lens group support frame 16 is provided at the front end thereof with three first linear guide projections 16a which project radially outwards to be slidably engaged in the three rear linear guide slots 12c of the front large-diameter portion 12a, respectively, and is further provided in the vicinity of the rear end thereof with three second linear guide projections 16b which project radially outwards to be slidably engaged in the three rear linear guide slots 12d on the rear small-diameter portion 12b. Accordingly, the third lens group support frame 16 is guided linearly in the optical axis direction without rotating about the optical axis O with respect to the stationary ring 12 due to the engagement of the three linear guide projections 16a with the three front linear guide slots 12c and the engagement of the three second linear guide projections 16b with the three rear linear guide slots 12d.

The zoom lens 10 is provided around the stationary ring 12 with a first cam ring 17 and a second cam ring 18. The first cam ring 17 is fitted on the large-diameter portion 12a to be freely rotatable about the optical axis O without moving along the optical axis O with respect to the large-diameter portion 12a, and the second cam ring 18 is fitted on the small-diameter portion 12b to be freely rotatable about the optical axis O without moving along the optical axis O with respect to the small-diameter portion 12b. The first cam ring 17 is provided at a rear end thereof with three pairs of engaging projections 17a (see FIG. 2) which project rearwards., while the second cam ring 18 is provided at a front end thereof with three engaging projections 18a (see FIGS. 3 and 4) which project radially outwards to be engaged with the three pairs of engaging projections 17a, respectively, so that the first cam ring 17 and the second cam ring 18 can integrally rotate at all times. The second cam ring 18 is provided on an outer peripheral surface thereof with a rotation transfer projection 18b which is elongated in a direction parallel to the optical axis O. The zoom ring 13 is provided on an inner peripheral surface thereof with a rotation transfer arm 13a which projects radially inwards to be engaged with the rotation transfer projection 18b of the second cam ring 18. Accordingly, manually rotating the zoom ring 13 causes both the first cam ring 17 and the second cam ring 18 to rotate together with the zoom ring 13 due to the engagement of the rotation transfer arm 13a with the rotation transfer projection 18b.

Figure 3:
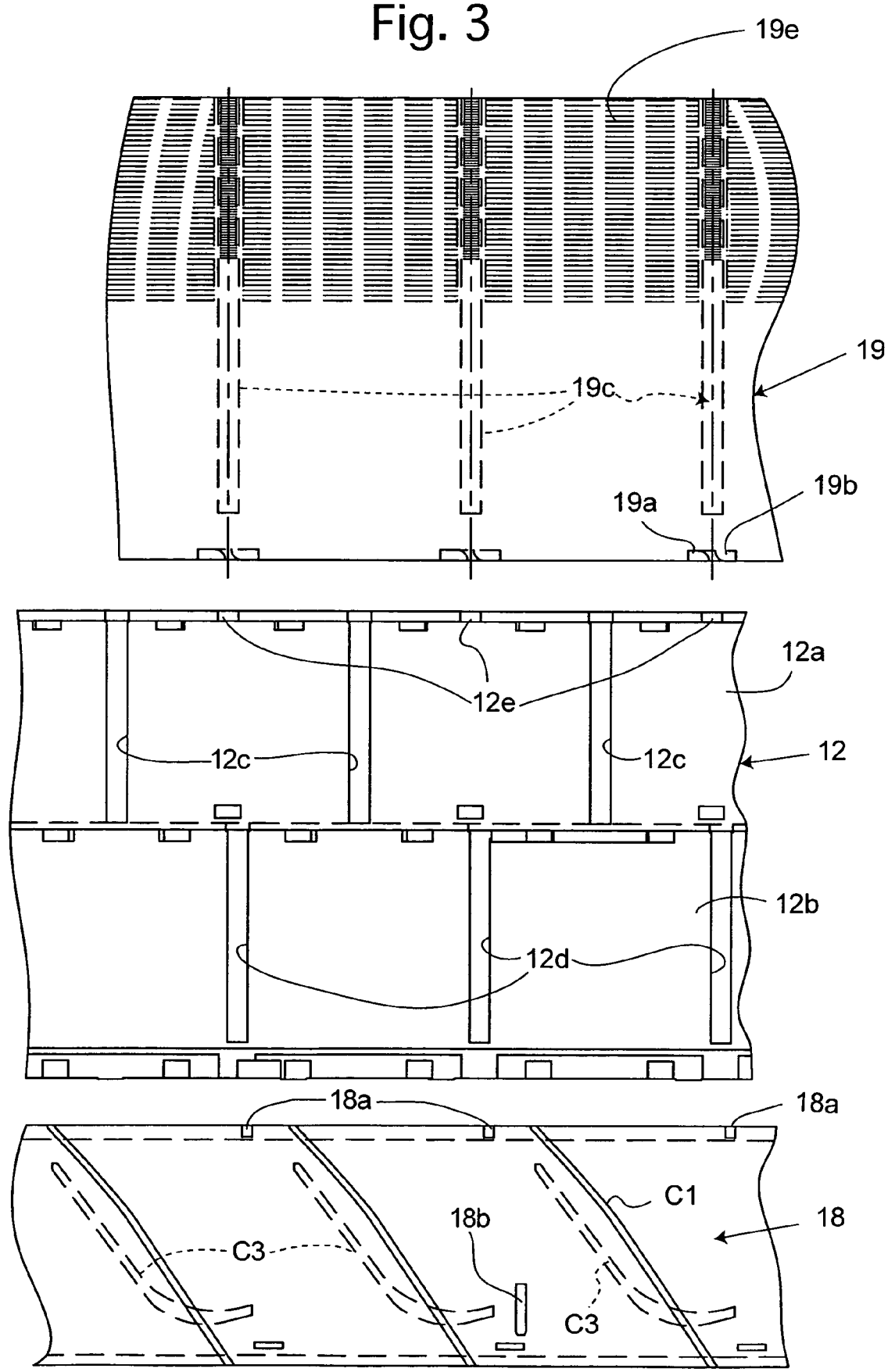
FIG. 3 is an exploded and developed view of a first lens group support ring, the stationary ring and a second cam ring of the zoom lens shown in FIG. 1.

The second cam ring 18 is provided on an outer peripheral surface thereof with three first cam ribs C1, and is provided on an inner peripheral surface of the second cam ring 18 with three third cam ribs C3 (see FIGS. 3 and 4). The first cam ring 17 is provided on an inner peripheral surface thereof with three second cam ribs C2 (see FIG. 2). The zoom lens 10 is provided around the first cam ring 17 and the second cam ring 18 with a first moving ring 19. The first moving ring 19 is provided at the rear end thereof on an inner peripheral surface of the first moving ring 19 with three pairs of cam followers 19a and 19b (see FIG. 3), each pair of which is engaged with the associated first cam rib C1 of the second cam ring 18 in a manner to hold the first cam rib C1 between the pair of cam followers 19a and 19b.

The first moving ring 19 is provided on an inner peripheral surface thereof with three linear guide grooves 19c which extend parallel to the optical axis O. The stationary ring 12 is provided at the front end thereof with three engaging projections 12e (see FIGS. 2 and 3) which are engaged in the three linear guide grooves 19c of the first moving ring 19, respectively. The first moving ring 19 is provided at the front end thereof on an outer peripheral surface of the first moving ring 19 with a male thread portion 19d. The zoom lens 10 is provided around the front of the first moving ring 19 with a first lens group support frame 20. The first lens group support frame 20 is provided on an inner peripheral surface thereof with a female thread portion 20c which is engaged with the male thread portion 19d of the first moving ring 19. The first lens group L1 is fixed to a lens holder 21 which is screwed into the first lens group support frame 20 to be fixed thereto. Accordingly, a rotation of the second cam ring 18 (the zoom ring 13) causes the first moving ring 19 (the first lens group L1), which is guided linearly along the optical axis O without rotating about the optical axis O by the engagement of the three engaging projections 12e with the three linear guide grooves 19c, to move linearly along the optical axis O in accordance with the contours of the three first cam ribs C1.

Each of the three second linear guide projections 16b of the third lens group support frame 16 is provided at the end thereof with a pair of cam followers 16c and 16d, each pair of which is engaged with the associated third cam rib C3 of the second cam ring 18 in a manner to hold the third cam rib C3 between the pair of cam followers 16c and 16d (see FIG. 4). Likewise, each of the three linear guide projections 15a of the second lens group support frame 15 is provided at the end thereof with a pair of cam followers 15b and 15c, each pair of which is engaged with the associated second cam rib C2 of the second cam ring 18 in a manner to hold the second cam rib C2 between the pair of cam followers 15b and 15c (see FIG. 2). Since each of the second lens group support frame 15 and the third lens group support frame 16 is guided linearly along the optical axis by the stationary ring 12 without rotating, a rotation of the first cam ring 17 and the second cam ring 18 (a rotation of the zoom ring 13) causes the second lens group support frame 15 (the second lens group L2) to move along the optical axis O in accordance with the contours of the three second cam ribs C2, and further causes the third lens group support frame 16 (the third lens group L3) to move along the optical axis O in accordance with the contours of the three third cam ribs C3 to perform a zooming operation together with the above described linear movement of the first moving ring 19 (the first lens group L1) in accordance with the contours of the three first cam ribs C1.

The first lens group support frame 20 is provided on an outer peripheral surface thereof with three radial projections 20b (only one of them appears in FIG. 1) which project radially outwards to be engaged in three rotation transfer grooves 14a (only one of them appears in FIG. 1) which are formed on an inner peripheral surface of the focus ring 14 to extend parallel to the optical axis O. Accordingly, manually rotating the focus ring 14 causes the first lens group support frame 20 to move along the optical axis O while rotating about the optical axis O with respect to the first moving ring 19, which is guided linearly along the optical axis O without rotating, due to the engagement of the female thread portion 20c with the male thread portion 19d to perform a focusing operation.

The first cam ring 17 is provided on an outer peripheral surface thereof with a light-shielding knurled surface 17c (see FIG. 1), while the first moving ring 19 is provided, on an inner peripheral surface thereof which faces the light-shielding knurled surface 17c, with a light-shielding knurled surface 19e (see FIGS. 1 and 3) which faces the light-shielding knurled surface 17c.

In the above described embodiment of the zoom lens 10, the mount ring (inner ring-shaped member) 11 and the focus ring (outer ring-shaped member) 14 are coupled to each other by the bayonet coupling, according to the present invention. As described above, the focus ring 14 is an element of the zoom lens 10 which is supported by the mount ring 11 in a manner to be rotatable relative to the mount ring 11 within a predetermined range of rotation without moving along the optical axis O relative to the mount ring 11. FIGS. 5 through 9 are diagrams each showing the bayonet coupling of the zoom lens 10.

Figure 5:
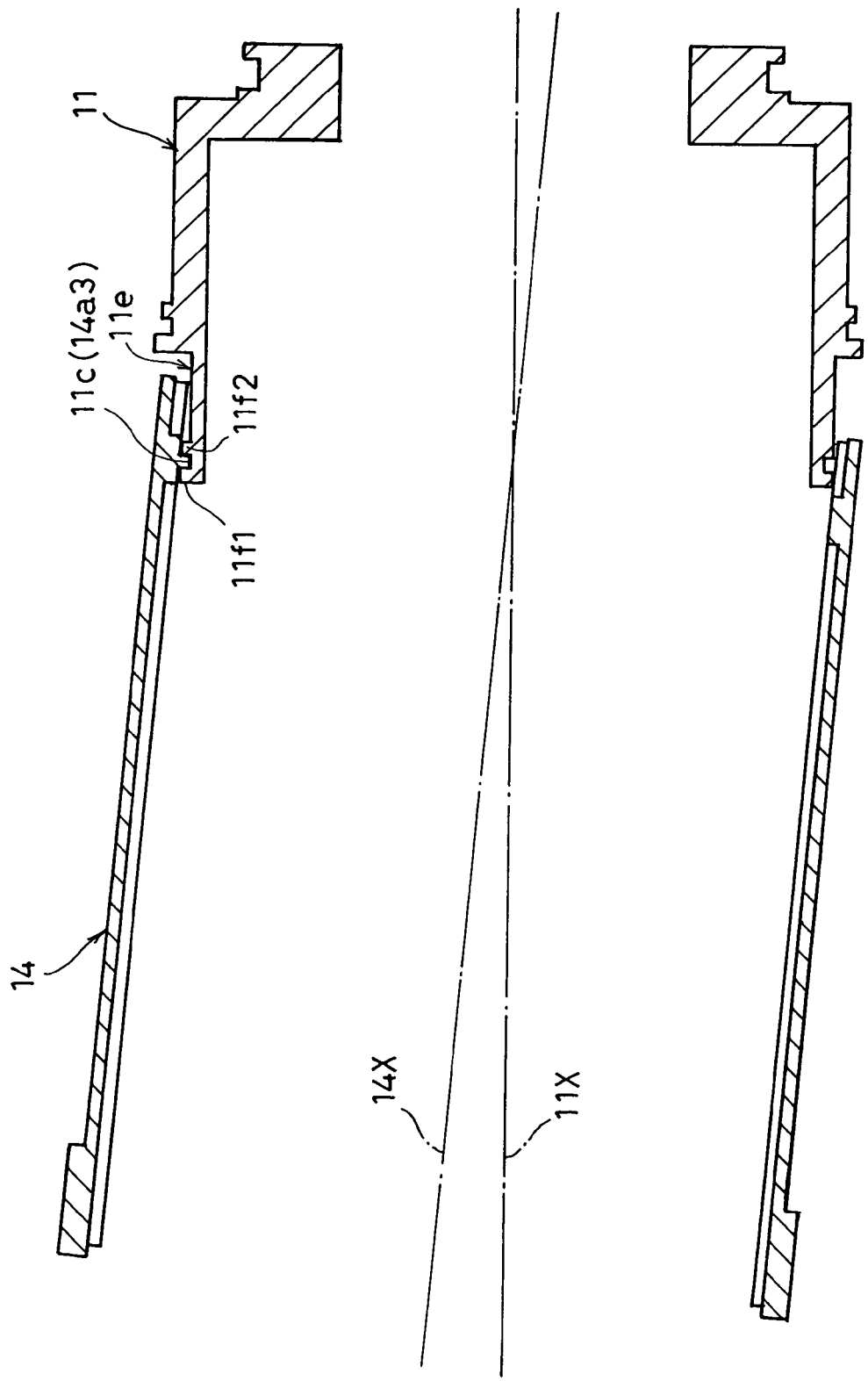
FIG. 5 is a longitudinal cross sectional view of a mount ring (inner ring-shaped member) and a focus ring (outer ring-shaped member), showing an embodiment of a bayonet coupling between the mount ring and the focus ring in a state where the axis of the mount ring and the axis of the focus ring are inclined to each other.
Figure 6:
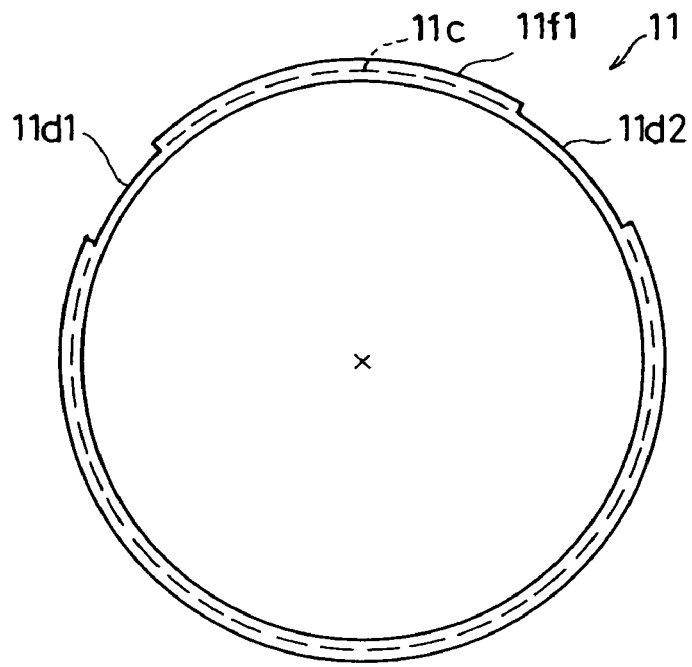
FIG. 6 is a front elevational view of the mount ring shown in FIGS. 1 and 5, showing an annular groove and insertion openings of the mount ring.

As shown in FIGS. 1, 5 and 6, the mount ring 11 is provided, on an outer peripheral surface thereof at the front end of the mount ring 11, with a pair of outer flanges: a front flange 11f1 and a rear flange 11f2 each of which projects radially outwards to form an annular groove (circumferential annular groove) 11c between the front flange 11f1 and the rear flange 11f2. The front flange 11f1 is provided with two insertion openings (cutout portions extending in a direction parallel to the optical axis O) 11d1 and 11d2 which are formed to correspond to two bayonet lugs 14a1 and 14a2, respectively, which project radially inwards from an inner peripheral surface of the focus ring 14 in the vicinity of the rear end of the focus ring 14. In FIG. 6, the rear flange 11f2 is not shown for the purpose of clearly showing the two insertion openings 11d1 and 11d2.

Figure 7:
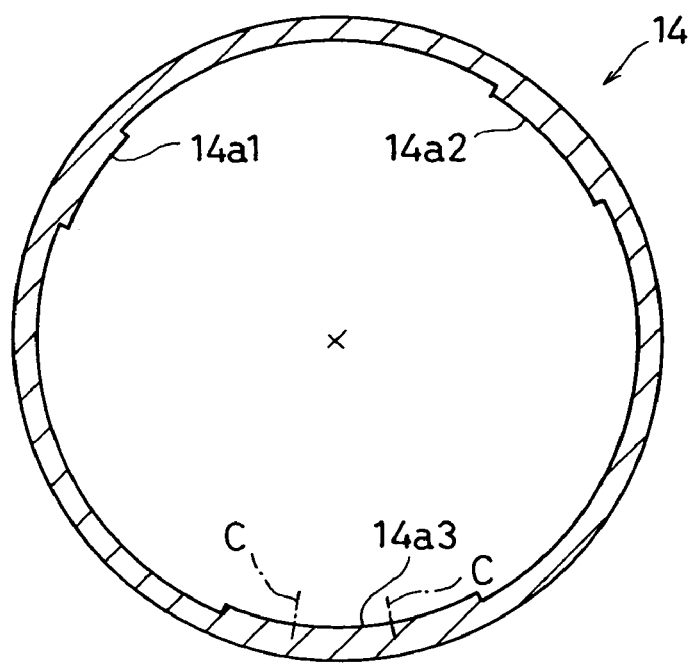
FIG. 7 is a cross sectional view of the focus ring shown in FIGS. 1 and 5, showing bayonet lugs of the focus ring.

On the other hand, the focus ring 14 is provided, on an inner peripheral surface thereof in the vicinity of the rear end of the focus ring 14, with three bayonet lugs: the two bayonet lugs (first and second bayonet lugs) 14a1 and 14a2 and a third bayonet lug 14a3 as shown in FIG. 7. These three bayonet lugs 14a1, 14a2 and 14a3 have different circumferential widths (or angular widths; hereinafter also referred to simply as "widths"). The first, second and third bayonet lugs 14a1, 14a2 and 14a3 are circumferentially arranged in order of increasing or decreasing width.

Among the three bayonet lugs 14a1, 14a2 and 14a3, the first bayonet lug 14a1 and the second bayonet lug 14a2 are hereinafter referred to as "A-bayonet lugs" for which corresponding two insertion openings (the two insertion openings 11d1 and 11d2) provided on the front flange 11f1 of the mount ring 11, while the third bayonet lug 14a3, which has the widest width among all the three bayonet lugs, is hereinafter referred to as an "B-bayonet lug" for which no corresponding insertion opening exists on the front flange 11f1 of the mount ring 11.

A manner of axially mounting the focus ring 14 on the mount ring 11 will be discussed hereinafter. Firstly, an axis 11X of the mount ring 11 and an axis 14X of the focus ring 14 are made to be inclined to each other in a state where the two insertion openings 11d1 and 11d2 and the A-bayonet lugs 14a1 and 14a2 are roughly aligned. In this state, the B-bayonet lug 14a3 is inserted into the annular groove 11c to be engaged therewith. At this stage, the B-bayonet lug 14a3 can be inserted into the annular groove 11c because the focus ring 14 can be tilted largely to the mount ring 11 as shown in FIG. 5 due to a clearance recess 11e (see FIG. 5) which is formed on an outer peripheral surface of the mount ring 11 immediately behind the rear flange 11f2. As appreciated by those skilled in the art, the clearance recess 11e can be small or omitted if the A-bayonet lugs 14a1 and 14a2, and the B-bayonet lug 14a3 are formed at the rear end of the focus ring 14.

After the B-bayonet lug 14a3 is inserted into the annular groove 11c in the above described manner, the focus ring 14 is made to move relative to the mount ring 11 in a direction to bring the axis 14X into alignment with the axis 11X of the mount ring 11. At this stage, if the A-bayonet lugs are made to be precisely aligned with the two insertion openings 11d1 and 11d2, the A-bayonet lugs are inserted into the annular groove 11c through the two insertion openings 11d1 and 11d2, respectively, as shown in FIG. 8.

Figure 8:
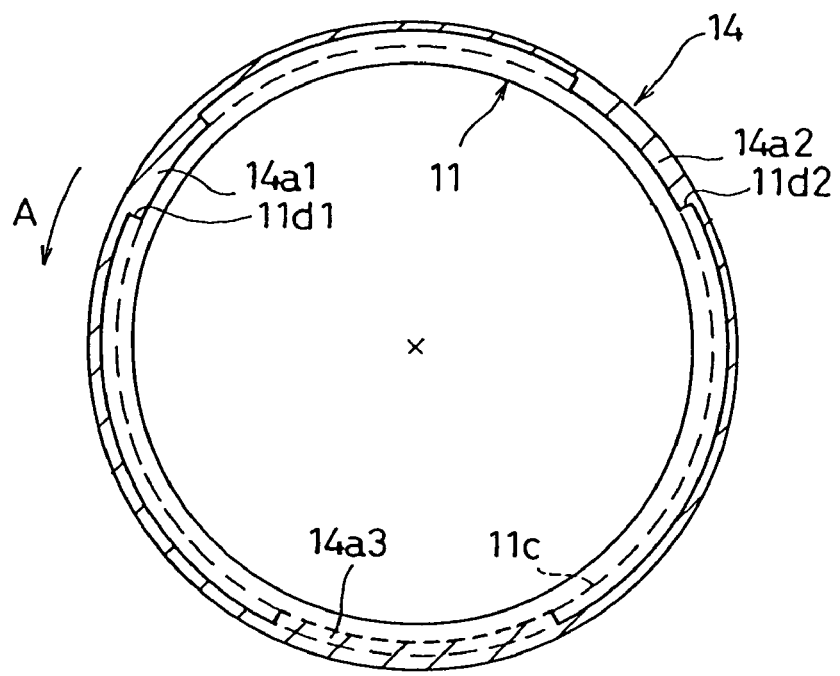
FIG. 8 is a front elevational view of the mount ring and the focus ring, showing a state immediately after the bayonet lugs of the focus ring are inserted into the annular groove of the mount ring.

In the state shown in FIG. 8, the focus ring 14 is made to rotate slightly with respect to the mount ring 11 in a direction shown by an arrow A in FIG. 8, and then a stop member (not shown) is engaged with the focus ring 14 to prevent the focus ring 14 from rotating in a direction reverse to the direction shown by the arrow A. The direction of rotation of the focus ring 14 which is shown by the arrow A is determined so as to move the A-bayonet lug 14a2, which is greater in width than the A-bayonet lug 14a1, toward the insertion opening 11d1 for the A-bayonet lug 14a1, which is smaller in width than the insertion opening 11d2 for the A-bayonet lug 14a2. Namely, in a state where the aforementioned stop member is engaged with the focus ring 14, the A-bayonet lug 14a1 that is smaller in width than the A-bayonet lug 14a2 is prevented from rotating in a direction toward the insertion opening 11d2, that is greater in width than the insertion opening 11d1. Even if the focus ring 14 rotates in the direction reverse to the direction shown by the arrow A to a point at which A-bayonet lug 14a1 is aligned with the insertion opening 11d2, A-bayonet lug 14a1 is not disengaged from the annular groove 11c through the insertion opening 11d2 because both the A-bayonet lug 14a2 and the B-bayonet lug 14a3 still remain in the annular groove 11c.

Figure 9:
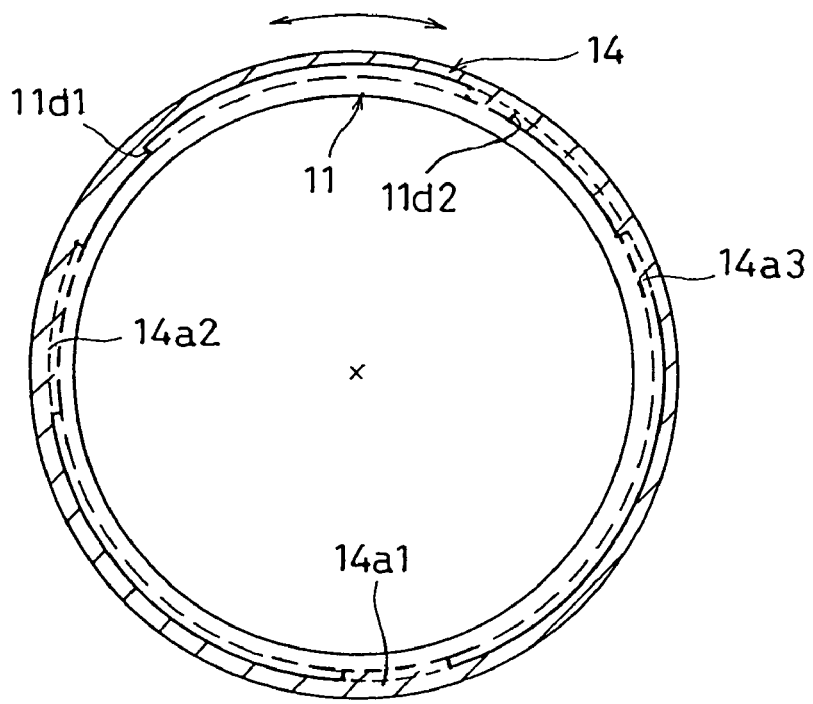
FIG. 9 is a view similar to that of FIG. 8, and shows a state where the mount ring and the focus ring have been rotated relative to each other after the bayonet lugs are inserted into the annular groove.

A further rotation of the focus ring 14 in the direction shown by the arrow A relative to the mount ring 11, after the aforementioned slight rotation of the focus ring 14 in the same direction, causes the A-bayonet lug 14a2 to pass by the insertion opening 11d1 (which has a narrower width than the A-bayonet lug 14a2), and at the same time, causes the B-bayonet lug 14a3 to pass by the insertion opening 11d2 (which has a narrower width than the B-bayonet lug 14a3). Therefore, the focus ring 14 is not disengaged from the mount ring 11; moreover, a satisfactory operability of the focus ring 14 is achieved. FIG. 9 shows a state where all the three bayonet lugs, i.e., the A-bayonet lugs 14a1 and 14a2, and the B-bayonet lug 14a3, are positioned in the annular groove 11c while the A-bayonet lug 14a1 has been rotated to the bottom position of the annular groove 11c as viewed in FIG. 9. Accordingly, it can be understood that there is no possibility of the A-bayonet lugs 14a1 and 14a2 being disengaged from the annular groove 11c through the two insertion openings 11d1 and 11d2 until the A-bayonet lugs 14a1 and 14a2 are again aligned with the two insertion openings 11d1 and 11d2, respectively. Moreover, even if the A-bayonet lugs 14a1 and 14a2 are again aligned with the two insertion openings 11d1 and 11d2, respectively, the A-bayonet lugs 14a1 and 14a2 are not disengaged from the annular groove 11c through the two insertion openings 11d1 and 11d2, respectively, unless one of the mount ring 11 and the focus ring 14 is tilted with respect to the other as shown in FIG. 5. Accordingly, to prevent the A-bayonet lugs 14a1 and 14a2 from being disengaged from the annular groove 11c through the two insertion openings 11d1 and 11d2, respectively, another stop member only needs to be engaged with the focus ring 14 before the focus ring 14 rotates by 360 degrees in the direction shown by the arrow A from the state shown in FIG. 8. In FIG. 9, all the three bayonet lugs 14a1, 14a2 and 14a3 are diagonally shaded for the purpose of illustration even if each bayonet lug is fully or partly hid behind the front flange 11f1.

Although the mount ring 11 that serves as an inner ring-shaped member has two insertion openings (11d1 and 11d2) while the focus ring 14 that serves as an outer ring-shaped member has three bayonet lugs (14a1, 14a2 and 14a3) in the above illustrated embodiment of the bayonet coupling incorporated in the zoom lens 10, the mount ring 11 can be provided with only one insertion opening in the present invention. In practice, it is desirable that the number of the insertion openings be four or five at most.

Although an annular groove (11c) is formed on an outer peripheral surface of the inner ring-shaped member (11) while a plurality of bayonet lugs (14a1, 14a2 and 14a3) are formed on an inner peripheral surface of the outer ring-shaped member (14) in the above illustrated embodiment of the bayonet coupling incorporated in the zoom lens 10, the present invention can be achieved even if the annular groove is formed on an inner peripheral surface of the outer ring-shaped member while the plurality of bayonet lugs are formed on an outer peripheral surface of the inner ring-shaped member.

In the bayonet coupling for axially mounting one of two relatively rotatable ring-shaped members on the other according to the present invention, the two relatively rotatable ring-shaped members become more difficult to be disengaged from each other if the circumferential width of the B-bayonet lug, for which no corresponding insertion opening exists, is made greater than the circumferential width of any of the A-bayonet lugs, for which a corresponding insertion opening exists, regardless of the number of bayonet lugs.

In the case of providing one and the other of the two relatively rotatable ring-shaped members with a plurality of A-bayonet lugs and a corresponding plurality of insertion openings, respectively, it is desirable that the plurality of A-bayonet lugs have different circumferential widths while the plurality of insertion openings have different circumferential widths correspondingly. In addition, it is desirable that the circumferential widths of the plurality of the A-bayonet lugs be different from each other while the circumferential widths of the corresponding plurality of insertion openings be different from each other correspondingly, so that one of the A-bayonet lugs having a wide circumferential width passes by the insertion opening for another of the A-bayonet lugs having a narrow circumferential width when one of the two relatively rotatable ring-shaped members rotates relative to the other to improve the operability of the two relatively rotatable ring-shaped members.

The B-bayonet lug, for which no corresponding insertion opening exists, can be divided into two or more than two bayonet lugs in a circumferential direction. In FIG. 7, two one-dot chain lines C indicate an example of parting lines when the B-bayonet lug is divided into three.

The present invention can be applied not only to an interchangeable zoom lens such as the above described embodiment of the zoom lens, but also to a bayonet coupling of any other device in general.

As can be understood from the foregoing, according to the present invention, a bayonet coupling for axially mounting one of two relatively rotatable ring-shaped members on the other is achieved, wherein the bayonet coupling has been devised while breaking the established idea of making the number of the insertion openings and the number of the bayonet lugs correspond to each other in a one-to-one relationship, so that a wide range of rotation between the two relatively rotatable ring-shaped members and a satisfactory operability of the two relatively rotatable ring-shaped members, which cannot be expected to be obtained in any conventional bayonet couplings if no corresponding insertion opening exists for one or more bayonet lug, are obtained, and further wherein one of the two relatively rotatable ring-shaped members can be axially mounted on the other by making the axes of the two relatively rotatable ring-shaped members inclined to each other during assembly even if no corresponding insertion opening exists for one or more bayonet lug.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A bayonet coupling for axially mounting an outer ring-shaped member on an inner ring-shaped member to allow a relative rotation therebetween, comprising:

one and the other of an annular groove and a plurality of bayonet lugs which are formed on an outer peripheral surface of said inner ring-shaped member and an inner peripheral surface of said outer ring-shaped member, respectively, so that said plurality of bayonet lugs are engaged in said annular groove to be rotatable relative to said annular groove; and a plurality of insertion openings which are formed on one of said inner ring-shaped member and said outer ring-shaped member which includes said annular groove, said annular groove being open in a direction parallel to an axial direction through each insertion opening of said plurality of insertion openings;

wherein said plurality of bayonet lugs includes a plurality of first bayonet lugs which are associated with said plurality of insertion openings to be insertable into said annular groove through said plurality of insertion openings, respectively, and at least one second bayonet lug for which no associated insertion opening is formed on said one of said inner ring-shaped member and said outer ring-shaped member which includes said annular groove; and wherein said plurality of insertion openings, said plurality of first bayonet lugs and said second bayonet lug are shaped so that said second bayonet lug is insertable into said annular groove with axes of said outer ring-shaped member and said inner ring-shaped member being inclined to each other, and so that said plurality of first bayonet lugs are insertable into said annular groove through said plurality of insertion openings, respectively, after said second bayonet lug is inserted into said annular groove.

2. The bayonet coupling according to claim 1, wherein said second bayonet lug comprises a plurality of bayonet lugs.

3. The bayonet coupling according to claim 1, wherein a circumferential width of said second bayonet lug is greater than a width of any bayonet lug of said plurality of first bayonet lugs.

4. The bayonet coupling according to claim 1, wherein said plurality of first bayonet lugs have different circumferential widths, and said plurality of insertion openings have different circumferential widths correspondingly.

5. The bayonet coupling according to claim 4, wherein said circumferential widths of said plurality of first bayonet lugs are different from each other and said circumferential widths of said plurality of insertion openings are different from each other correspondingly, so that one bayonet lug of said plurality of first bayonet lugs which has a wide circumferential width passes by the insertion opening of said plurality of insertion openings for another bayonet lug of said plurality of first bayonet lugs which has a narrow circumferential width when one of said outer ring-shaped member and said inner ring-shaped member rotates relative to the other.

6. The bayonet coupling according to claim 1, wherein said inner ring-shaped member is a stationary member of a lens barrel, and wherein said outer ring-shaped member is a rotatable ring-shaped member of said lens barrel.

7. The bayonet coupling according to claim 1, wherein said annular groove and said plurality of bayonet lugs are formed on said outer peripheral surface of said inner ring-shaped member and said inner peripheral surface of said outer ring-shaped member, respectively, wherein said annular groove is formed between a pair of outer flanges formed on said outer peripheral surface of said inner ring-shaped member, and wherein a plurality of cutout portions are formed on one of said pair of outer flanges to serve as said plurality of insertion openings.

8. The bayonet coupling according to claim 7, wherein a recess is formed on said outer peripheral surface of said inner ring-shaped member immediately behind the other of said pair of outer flanges.

* * * * *